(12) United States Patent
Nishi

(10) Patent No.: US 11,244,133 B2
(45) Date of Patent: Feb. 8, 2022

(54) INFORMATION PROCESSING APPARATUS AND INFORMATION PROCESSING METHOD

(71) Applicant: FeliCa Networks, Inc., Tokyo (JP)

(72) Inventor: Masahiro Nishi, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 0 days.

(21) Appl. No.: 17/257,981

(22) PCT Filed: Jul. 22, 2019

(86) PCT No.: PCT/JP2019/028589
§ 371 (c)(1),
(2) Date: Jan. 5, 2021

(87) PCT Pub. No.: WO2020/026866
PCT Pub. Date: Feb. 6, 2020

(65) Prior Publication Data
US 2021/0271838 A1 Sep. 2, 2021

(30) Foreign Application Priority Data
Jul. 30, 2018 (JP) .............................. JP2018-142337

(51) Int. Cl.
*G06K 7/14* (2006.01)
*G06K 19/06* (2006.01)
*H04B 5/00* (2006.01)

(52) U.S. Cl.
CPC ......... *G06K 7/1417* (2013.01); *G06K 7/1413* (2013.01); *G06K 19/06028* (2013.01); *G06K 19/06037* (2013.01); *H04B 5/0056* (2013.01)

(58) Field of Classification Search
CPC .. G06K 7/14; G06K 7/1417; G06K 19/06037; G06K 19/06028
USPC .............. 235/462.1, 462.09, 462.24, 462.41, 235/462.45
See application file for complete search history.

(56) References Cited

U.S. PATENT DOCUMENTS

| | | | |
|---|---|---|---|
| 8,459,560 B1* | 6/2013 | Mineo-Goggin | ........ G02B 5/32 235/487 |
| 2004/0000589 A1* | 1/2004 | Smith | .............. G06K 19/06028 235/462.01 |
| 2013/0334308 A1* | 12/2013 | Priebatsch | ............. G06Q 90/00 235/383 |

(Continued)

FOREIGN PATENT DOCUMENTS

| | | |
|---|---|---|
| JP | 2006-333269 A | 12/2006 |
| JP | 2009-053765 A | 3/2009 |

(Continued)

*Primary Examiner* — Edwyn Labaze
(74) *Attorney, Agent, or Firm* — Paratus Law Group, PLLC

(57) ABSTRACT

This information processing apparatus includes an instruction determining unit and a signal output unit. The instruction determining unit determines an instruction related to communication using a code image with an external apparatus. The signal output unit outputs, on the basis of the determined instruction related to the communication, a signal for controlling an operation related to communication of the external apparatus. Accordingly, high usability can be provided for communication with the external apparatus.

18 Claims, 9 Drawing Sheets

(56) References Cited

U.S. PATENT DOCUMENTS

| | | | |
|---|---|---|---|
| 2014/0025785 A1* | 1/2014 | Zahnow | G07C 1/10 709/219 |
| 2018/0053027 A1* | 2/2018 | Todeschini | G06K 7/1447 |
| 2018/0137319 A1* | 5/2018 | Giordano | G06K 7/10554 |
| 2019/0340601 A1* | 11/2019 | Wang | G06Q 20/322 |

FOREIGN PATENT DOCUMENTS

| | | |
|---|---|---|
| JP | 2017-054235 A | 3/2017 |
| JP | 2018-098610 A | 6/2018 |

\* cited by examiner

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2019/028589 (filed on Jul. 22, 2019) under 35 U.S.C. § 371, which claims priority to Japanese Patent Application No. 2018-142337 (filed on Jul. 30, 2018), which are all hereby incorporated by reference in their entirety.

TECHNICAL FIELD

The present technology relates to an information processing apparatus and an information processing method that can be applied to contactless data communication and the like.

BACKGROUND ART

In recent years, services using various contactless integrated circuit (IC) cards or QR codes (registered trademark) have become widespread. For example, in an electronic wallet apparatus described in Patent Literature 1, an IC card used for communication with a reader/writer is automatically selected from a plurality of contactless IC cards on the basis of a plurality of card selection criteria. Accordingly, communication with the reader/writer using a desired IC card is realized (paragraphs [0023] and [0034], FIG. 4, and the like of Patent Literature 1).

CITATION LIST

Patent Literature

Patent Literature 1: Japanese Patent Application Laid-open No. 2009-53765

DISCLOSURE OF INVENTION

Technical Problem

It is considered that the services using contactless IC cards and QR codes will spread in various fields in the future, and it is desirable to provide a technology capable of providing high usability.

In view of the above-mentioned circumstances, it is an object of the present technology to provide an information processing apparatus and an information processing method that are capable of providing high usability for communication with an external apparatus.

Solution to Problem

In order to accomplish the above-mentioned object, an information processing apparatus according to an embodiment of the present technology includes an instruction determining unit and a signal output unit.

The instruction determining unit determines an instruction related to communication using a code image with an external apparatus.

The signal output unit outputs, on the basis of the determined instruction related to the communication, a signal for controlling an operation related to communication of the external apparatus.

In this information processing apparatus, the signal for controlling the operation related to the communication of the external apparatus is output on the basis of the instruction related to the communication using the code image with the external apparatus. With this configuration, the operation of the external apparatus can be controlled by a user inputting an instruction. As a result, high usability can be provided for communication with the external apparatus.

The signal may be a signal that is capable of being received by the external apparatus at a predetermined distance from the information processing apparatus.

With this configuration, a communication mode of the external apparatus can be controlled at a position at the predetermined distance. Accordingly, high usability can be provided.

The signal may include at least one of an audio signal or an optical signal.

With this configuration, the communication mode of the external apparatus can be easily controlled by using the audio signal or the optical signal, and the usability can be improved.

The information processing apparatus may further include a display unit. In this case, the instruction related to the communication may include an instruction to cause the display unit to display the code image.

With this configuration, the communication mode of the external apparatus can be controlled on the basis of the instruction to cause the code image to be displayed, and the usability can be improved.

The external apparatus may be capable of performing each of the communication using the code image and a near field communication (NFC) communication. In this case, the signal may cause the external apparatus to perform an operation related to the communication using the code image and regulate an operation related to the NFC communication.

With this configuration, the communication using the code image can be properly performed, and the usability can be improved.

The signal may regulate output of a polling signal as the regulation of the operation related to the NFC communication.

With this configuration, the influence of reception of the polling signal can be reduced, and the usability can be improved.

The signal may be a signal that is capable of being received by the external apparatus at a distance longer than an arrival distance of the polling signal output from the external apparatus. With this configuration, the influence of reception of the polling signal can be reduced, and the usability can be improved.

The information processing apparatus may further include a communication unit capable of performing the NFC communication with the external apparatus. In this case, the instruction determining unit may determine an instruction related to the NFC communication. Further, the signal output unit may be capable of causing the external apparatus to perform the operation related to the NFC communication on the basis of the determined instruction related to the NFC communication and outputting a signal for regulating the operation related to the communication using the code image.

With this configuration, the NFC communication can be properly performed, and the usability can be improved.

An information processing method according to an embodiment of the present technology is an information processing method performed by a controller in an information processing apparatus, the information processing method including determining an instruction related to communication using a code image between an external apparatus and the information processing apparatus.

A signal for controlling an operation related to the communication between the external apparatus and the information processing apparatus is output on the basis of the determined instruction related to the communication.

An information processing apparatus according to another embodiment of the present technology includes a code reading unit, an NFC communication unit, a detecting unit, and a communication operation control unit.

The code reading unit performs communication using a code image with an external apparatus.

The NFC communication unit performs communication using near field communication (NFC) with an external apparatus.

The detecting unit detects peripheral information.

The communication operation control unit controls an operation related to the communication of the code reading unit and the NFC communication unit on the basis of the detected peripheral information.

In this information processing apparatus, the operation related to the communication of the code reading unit and the NFC communication unit communicable with the external apparatus is controlled on the basis of the detected peripheral information. With this configuration, the usability for the user using the external apparatus can be improved.

The peripheral information may include at least one of sound information regarding a sound, optical information regarding light, image information regarding an image, and motion information regarding an object.

With this configuration, a communication method desired by the user using the external apparatus can be properly realized, and the usability can be improved.

The communication operation control unit may generate a signal for controlling the operation related to the communication of the code reading unit and the NFC communication unit on the basis of the detected peripheral information and control the operation related to the communication of the code reading unit and the NFC communication unit on the basis of the generated signal.

With this configuration, the communication with the external apparatus can be properly performed on the basis of the peripheral information, and the usability can be improved.

The signal may include any one of an audio signal, an optical signal, a motion signal, or an image signal.

With this configuration, the communication operation with the external apparatus can be easily controlled by using the audio signal, the optical signal, the motion signal, and the image signal, and the usability can be improved.

The communication operation control unit may be capable of causing reading of the code image by the code reading unit to be performed and regulating an operation related to the NFC communication by the NFC communication unit.

With this configuration, the communication using the code image can be properly performed, and the usability can be improved.

The communication operation control unit may be capable of regulating reading of the code image by the code reading unit and causing an operation related to the NFC communication by the NFC communication unit to be performed.

With this configuration, the NFC communication can be properly performed, and the usability can be improved.

The operation related to the NFC communication may include output of a polling signal. With this configuration, the communication method desired by the user using the external apparatus can be properly realized, and the usability can be improved.

The signal may include the audio signal, the optical signal, and the motion signal. In this case, the communication operation control unit may set a degree of priority to each of the audio signal, the optical signal, and the motion signal on the basis of the detected peripheral information and control the operation related to the communication of the code reading unit and the NFC communication unit on the basis of the set degree of priority.

With this configuration, the operation of the communication unit can be accurately controlled in accordance with a surrounding situation, and the usability can be improved.

An information processing method according to another embodiment of the present technology is an information processing method performed by a controller in an information processing apparatus, the information processing method including detecting peripheral information.

An operation related to communication using a code image with an external apparatus and communication using a near field communication (NFC) with the external apparatus is controlled on the basis of the detected peripheral information.

Advantageous Effects of Invention

As described above, in accordance with the present technology, high usability can be provided for communication with the external apparatus. It should be noted that the effects described here are not necessarily limitative and any effect described in the present disclosure may be provided.

MODE(S) FOR CARRYING OUT THE INVENTION

Hereinafter, embodiments according to the present technology will be described with reference to the drawings.

[Communication System]

Figure 1:
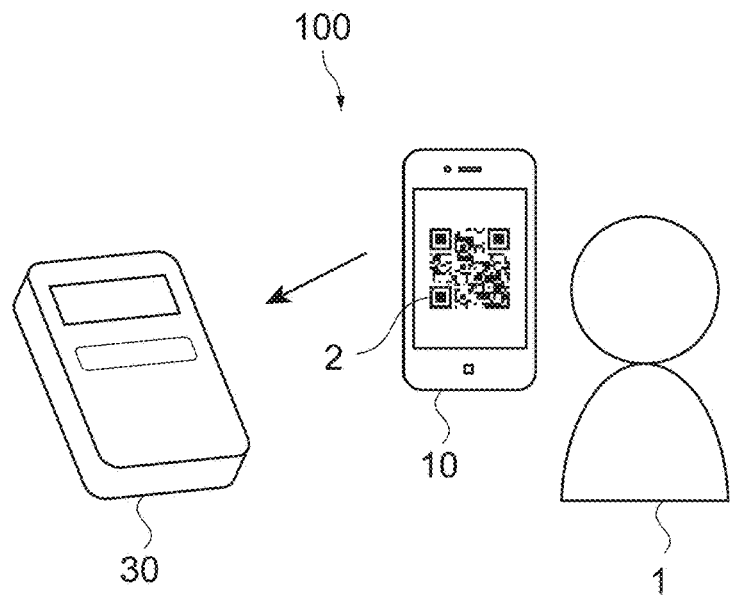
FIG. 1 A schematic diagram showing a configuration example of a communication system according to an embodiment of the present technology.

FIG. 1 is a schematic diagram showing a configuration example of a communication system according to an embodiment of the present technology. A communication system 100 includes a communication terminal 10 and a reader/writer 30.

The communication terminal 10 is a terminal used by a user 1. For example, a portable terminal such as a smartphone and a tablet terminal is used as the communication terminal 10. Additionally, any other terminal such as a game console, personal digital assistants (PDA), and a portable AV player may be used as the communication terminal 10.

In this embodiment, by inputting an instruction to the communication terminal 10 and starting a predetermined application, it is possible to display a code image 2 storing information such as a QR code is on a display unit of the communication terminal 10. Any other code image, such as a barcode, may be used as the code image 2. As a matter of course, it may be possible to display each of different types of code images, such as a QR code and a barcode.

Further, the communication terminal 10 is equipped with an IC chip and an antenna capable of performing contactless communication with the reader/writer 30 in a narrow range of about 10 cm. In this embodiment, communication (hereinafter referred to as NFC communication) according to a short-range radio standard (NFC: Near Field Communication) having an RF carrier frequency of 13.56 MHz and a communication speed of 100 to 400 Kbps can be performed.

Examples of the communication method of the NFC communication can include FeliCa (registered trademark). As a matter of course, the present technology is not limited to this communication method, and can also be applied to NFC communication of other communication methods.

The reader/writer 30 is capable of reading the code image 2 displayed on the display unit of the communication terminal 10 and obtaining the information stored in the code image 2. A plurality of types of code images 2 such as a QR code and a barcode may be configured to be each readable.

Further, the reader/writer 30 has an antenna and is capable of performing contactless communication with the communication terminal 10. That is, the reader/writer 30 is capable of performing NFC communication with the communication terminal 10.

Therefore, in this embodiment, it is possible to perform both communication using the code image 2 and NFC communication between the communication terminal 10 and the reader/writer 30.

The user 1 inputs an instruction into the communication terminal 10, starts the predetermined application, and causes the code image 2 to be displayed. Then, by causing the reader/writer 30 to read the displayed code image 2, it is possible to provide the information to the reader/writer 30.

Further, the user 1 sets the communication terminal 10 in a state in which it can perform NFC communication. Then, by bringing the communication terminal 10 to face the reader/writer 30, it is possible to perform NFC communication with the reader/writer 30.

Hereinafter, the description will be given by showing a case where the communication system 100 shown in FIG. 1 is applied to a payment system as an example. For example, the user 1 starts an application capable of performing payment using the code image 2, such as QR code payment and causes a predetermined code image 2 to be displayed. By causing the reader/writer 30 to read the displayed code image 2, payment is enabled to be performed.

Further, the communication terminal 10 is set in a state in which it can perform electronic money payment. The electronic money payment is performed by bringing the communication terminal 10 to face the reader/writer 30.

As an IC card capable of performing electronic money payment using NFC communication, many types of IC cards are used. Various business operators such as transportation business operators issue IC cards individually and the electronic money payment is enabled to be performed using each IC card.

In this embodiment, it is assumed that it is possible to perform electronic money payment using each of different types of IC cards (plurality of types of electronic money) between the communication terminal 10 and the reader/writer 30. Hereinafter, different types of NFC communication may be distinguished and described using alphabet, for example, as "NFC communication A using an IC card A issued by a business operator A" and "NFC communication B using an IC card B issued by a business operator B".

Figure 2:
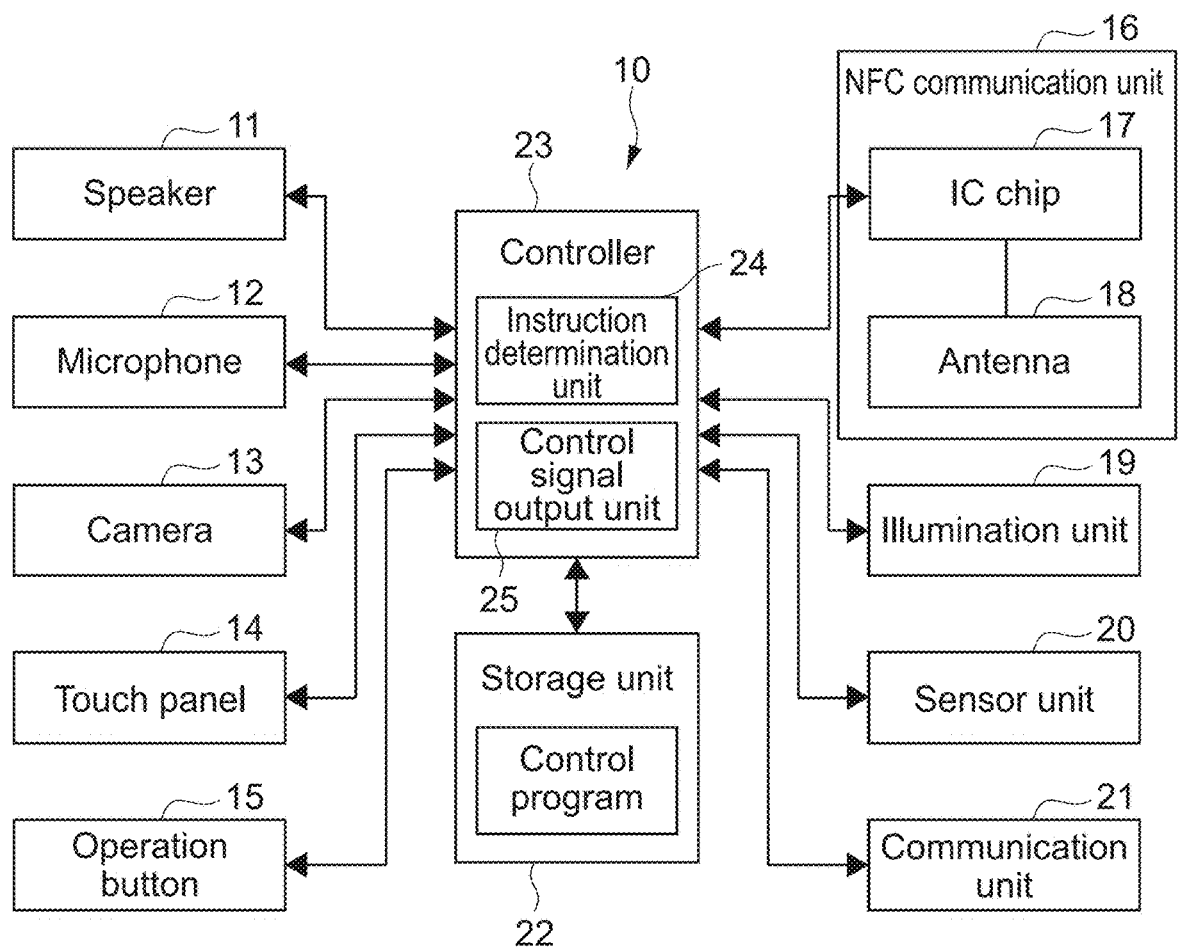
FIG. 2 A block diagram showing a functional configuration example of a communication terminal.

FIG. 2 is a block diagram showing a functional configuration example of the communication terminal 10. The communication terminal 10 includes a speaker 11, a microphone 12, a camera 13, a touch panel 14, an operation button 15, NFC communication unit 16, an illumination unit 19, a sensor unit 20, a communication unit 21, a storage unit 22, and a controller 23.

The speaker 11 is capable of outputting sounds. The speaker 11 outputs, for example, voice guidance, an alarm sound, and the like. Further, in this embodiment, the speaker 11 is capable of outputting an audio signal as a control signal for controlling an operation related to the communication of the reader/writer 30.

The microphone 12 is used for calling, inputting instructions by voice, collecting ambient sounds, and the like.

The camera 13 is capable of capturing images of the user 1 and the surroundings. As the camera 13, for example, a digital camera including an image sensor such as a complementary metal-oxide semiconductor (CMOS) sensor and a charge coupled apparatus (CCD) sensor is used. For example, it is also possible to employ a configuration to input an instruction of the user 1 by causing the camera 13 to capture an image of a gesture of the user 1.

The touch panel 14 functions as a display unit and is capable of displaying various images and GUIs. Further, the touch panel 14 is capable of receiving a touch operation of the user 1. The user 1 can input a predetermined instruction or the like via the touch panel 14. Further, the user 1 can display an arbitrary image such as the code image 2 on the touch panel 14.

The operation button 15 is provided to perform an operation different from the operation performed through the touch panel 14, such as an power on/off operation, for example.

The NFC communication unit 16 includes an IC chip 17 and an antenna 18. The IC chip 17 is an integrated circuit that realizes various functions associated with the NFC communication. The IC chip 17 is capable of performing NFC communication with the reader/writer 30 via the antenna 18.

Examples of the circuit in which the IC chip 17 is integrated can include a demodulation circuit or a regulator, a load modulation circuit for selectively performing load modulation including a load resistor and a switching circuit, a processing circuit for controlling various types of data processing and load modulation, a memory element capable of storing data, and the like. Further, the IC chip 17 may further include a carrier detection circuit that generates a rectangular detection signal for detecting reception of a carrier wave. Additionally, any other configuration may be employed as the IC chip 17.

The antenna 18 is, for example, a resonant circuit constituted by a coil having a predetermined inductance and a capacitor having a predetermined capacitance and functions as a sending and receiving antenna. In a case where the NFC communication is performed, polling signals, communication packets, and the like sent from the reader/writer 30 are received by the antenna 18. Further, the antenna 18 sends carrier waves, reply packets, and the like.

The illumination unit 19 has a light source such as a light emitting diode (LED) and a laser diode (LD) and is capable of outputting light. For example, by turning on the illumination unit 19, it is possible to illuminate a night road and the like like a light. Further, it is also possible to notify of mail reception or the like by the illumination unit 19. Further, in this embodiment, the illumination unit 19 is capable of outputting an optical signal as a control signal for controlling the operation related to the communication of the reader/writer 30.

The sensor unit 20 is capable of detecting a surrounding situation, a state of the communication terminal 10, a state of the user 1, and the like. For example, a 9-axis sensor, a GPS, a biometric sensor, and the like are mounted as the sensor unit 20. The 9-axis sensor includes a 3-axis acceleration sensor, a 3-axis gyro sensor, and a 3-axis compass sensor. It is possible to detect the acceleration, angular velocity, and azimuth of the communication terminal 10 in three axes by the 9-axis sensor. The GPS obtains information about the current location of the communication terminal 10.

The biometric sensor obtains biometric information of the user. For example, a temperature sensor capable of measuring body temperature, a heart rate sensor capable of measuring heart rate, a sweat sensor capable of measuring sweat rate, and the like are provided as the biometric sensor.

The type of the sensor provided as the sensor unit 20 is not limited, and an arbitrary sensor may be provided. For example, a temperature sensor, a humidity sensor, and the like capable of measuring a temperature, humidity, and the like of the environment where the communication terminal 10 is used may be provided. It should be noted that it is also possible to consider the microphone 12 and the camera 13 as parts of the sensor unit 20.

The communication unit 21 is a module used to perform, for example, network communication, near-field communication, and infrared communication with other devices. For example, a wireless LAN module such as a Wi-Fi, or a communication module such as Bluetooth (registered trademark) is provided. Further, any infrared communication module may also be used. It should be noted that it is also possible to view the NFC communication unit 16 as a part of the communication unit 21.

The storage unit 22 is a nonvolatile storage device, and, for example, a hard disk drive (HDD) or the like is used. The storage unit 22 stores a control program for controlling the overall operation of the communication terminal 10. Further, the storage unit 22 stores data used for performing various types of processing, data generated by various types of processing, and the like. The method of installing the control program and the like in the communication terminal 10 is not limited.

The controller 23 controls the operation of each block of the communication terminal 10. The controller 23 has a hardware configuration such as a CPU and memories (RAM and ROM) that are necessary for a computer. Various types of processing are performed in such a manner that the CPU loads the control program and the like stored in the storage unit 22, into the RAM and executes the control program and the like.

For example, a programmable logic device (PLD) such as a field programmable gate array (FPGA) and other devices such as an application specific integrated circuit (ASIC) may be used as the controller 23.

In this embodiment, the CPU of the controller 23 performs a program according to this embodiment, such that an instruction determining unit 24 and a control signal output unit 25 are realized as functional blocks, and an information processing method according to this embodiment is performed. It should be noted that in order to realize the instruction determining unit 24 and the control signal output unit 25, dedicated hardware such as an integrated circuit (IC) may be used as appropriate.

The instruction determining unit 24 determines an instruction input to the communication terminal 10. The instruction determining unit 24 performs, for example, the contents of an instruction input through a touch operation on the touch panel 14, the contents of an instruction by the sound input to the microphone 12, the contents of an instruction by a gesture input of the user 1 captured by the camera 13, and the like. The instruction determining unit 24 determines an instruction related to communication with the reader/writer 30 using the code image 2.

The control signal output unit 25 controls the output of an audio signal and an optical signal which are control signals for controlling the operation related to the communication of the reader/writer 30. The control signal output unit 25 outputs a control signal for controlling the operation related to the communication of the reader/writer 30 on the basis of the determined instruction related to the communication.

Further, in this embodiment, a communication unit capable of communicating with the reader/writer 30 is realized by the controller 23 that controls the NFC communication unit 16.

The specific algorithm performed by the instruction determining unit 24 and the control signal output unit 25 is not limited, and any algorithm may be used. For example, any machine-learning algorithm using a deep neural network (DNN) or the like may be used. For example, by using artificial intelligence (AI) or the like for performing deep learning, it is possible to improve the accuracy of instruction determination and output of the control signals.

In this embodiment, the communication terminal 10 functions as an information processing apparatus according to the present technology. It should be noted that as viewed from the reader/writer 30, which is a communication partner, the communication terminal 10 functions as an external apparatus according to the present technology.

Figure 3:
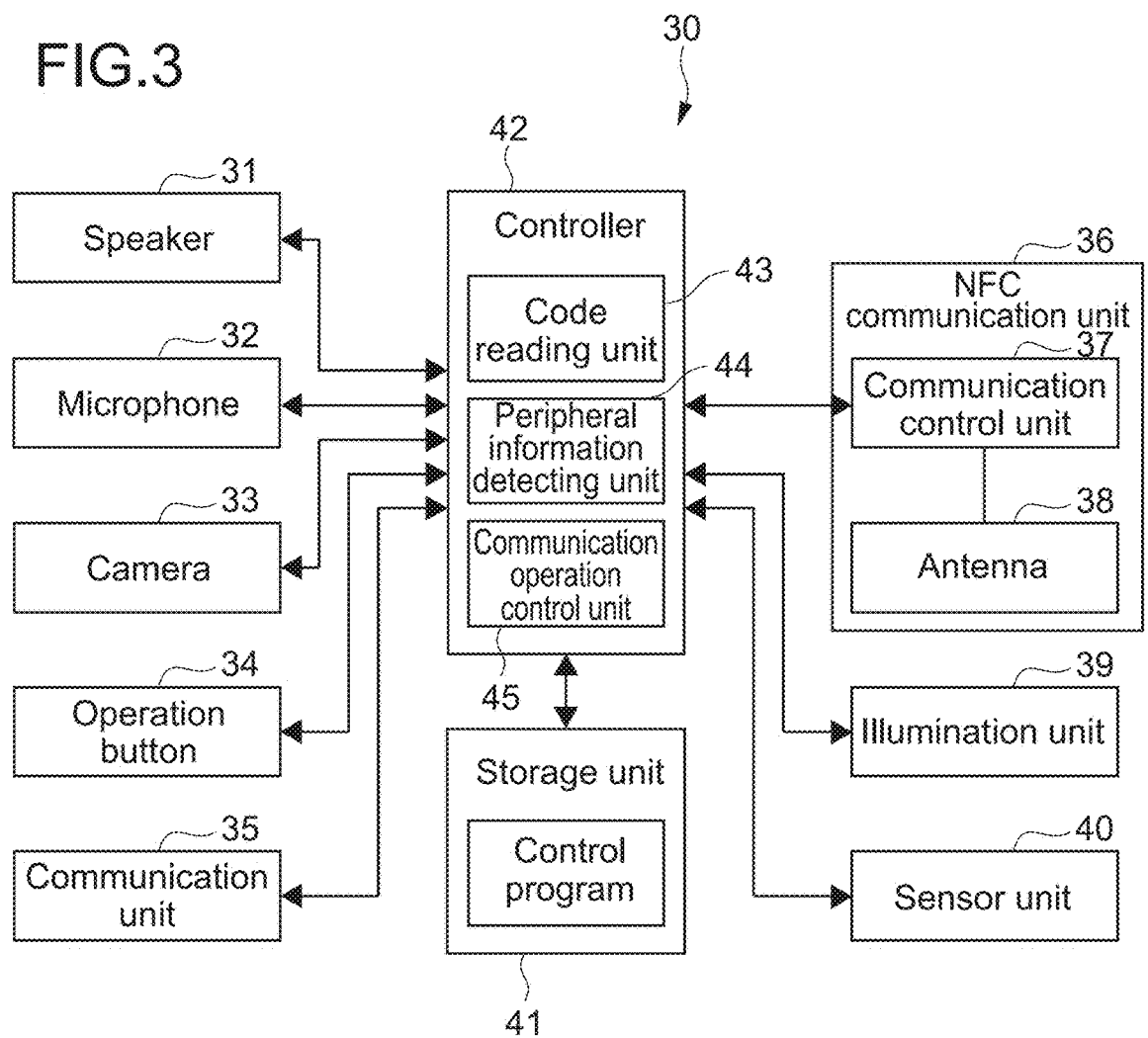
FIG. 3 A block diagram showing a functional configuration example of a reader/writer.

FIG. 3 is a block diagram showing a functional configuration example of the reader/writer 30. The reader/writer 30 includes a speaker 31, a microphone 32, a camera 33, an operation button 34, a communication unit 35, an NFC communication unit 36, an illumination unit 39, a sensor unit 40, a storage unit 41, and a controller 42.

The speaker 31 is capable of outputting sounds. The speaker 31 outputs, for example, voice guidance, an alarm sound, and the like. Further, the speaker 31 may also inform information about a current communication mode of the reader/writer 30. For example, audio output saying "NFC communication using IC card A is now possible", "communication using QR code is possible", or the like may be performed.

The microphone 32 is used for calling, inputting instructions by voice, collecting ambient sounds, and the like. In this embodiment, the microphone 32 receives the audio signal output from the communication terminal 10.

The camera 33 is capable of capturing images of the user 1 and the surroundings. As the camera 33, for example, a digital camera including an image sensor such as a CMOS sensor or a CCD sensor is used. In this embodiment, the camera 33 receives the optical signal output from the communication terminal 10. It should be noted that in order to receive the optical signal output from the communication terminal 10, a light receiving element such as a photodiode may be used instead of the camera 33 or in combination with the camera 33.

The operation button 34 is provided to perform operations of powering on/off, changing the communication mode, and the like, for example. It should be noted that a device having functions of a display unit and an operation unit, such as a touch panel, may be mounted.

The communication unit 35 is a module for performing, for example, network communication, near-field communication, and infrared communication with other devices. For example, a wireless LAN module such as a Wi-Fi, or a communication module such as Bluetooth is provided. Further, any infrared communication module may also be used.

The NFC communication unit 36 includes a communication control unit 37 and an antenna 38. The communication control unit 37 has various functions associated with the NFC communication, and is realized as an integrated circuit like the IC chip 17 mounted on the communication terminal 10, for example. The communication control unit 37 is capable of performing NFC communication with the communication terminal 10 via the antenna 38. An arbitrary configuration may be employed as the communication control unit 37.

The antenna 38 is, for example, a resonant circuit constituted by a coil having a predetermined inductance and a capacitor having a predetermined capacitance and functions as a sending and receiving antenna. In a case where the NFC communication is performed, polling signals, communication packets, and the like are sent by the antenna 38. Further, the antenna 38 receives carrier waves, reply packets, and the like sent from the communication terminal 10. It should be noted that it is also possible to view the NFC communication unit 36 as a part of the communication unit 35.

The illumination unit 39 has a light source such as an LED or an LD and is capable of outputting light. For example, the illumination unit 39 may express information about the current communication mode. Further, the illumination unit may express a state of the apparatus, such as a standby state, an on state, and an off state.

The sensor unit 40 is capable of detecting a surrounding situation, a state of the reader/writer 30, a state of the user 1 who will perform communication through the communication terminal 10, and the like.

For example, as the sensor unit 40, a 9-axis sensor, a GPS, a motion sensor, a ranging sensor, a temperature sensor, a humidity sensor or the like is mounted. It should be noted that the type of the sensor provided as the sensor unit 40 is not limited, and an arbitrary sensor may be provided.

In this embodiment, it is possible to detect a surrounding situation of the reader/writer 30 on the basis of the sound obtained by the microphone 32, the image captured by the camera 33, and the detection result of the sensor unit 40. For example, it is possible to detect sounds and light generated in the periphery, a color condition of the periphery, color and motion of an object existing in the periphery or approaching, contents of an image to be presented, and the like. Further, it is also possible to detect motion and the like of an object in the periphery.

The storage unit 41 is a nonvolatile storage device, and for example, an HDD or the like is used. The storage unit 41 stores a control program for controlling the overall operation of the reader/writer 30. Further, the storage unit 41 stores data used in performing various types of processing, data generated by various types of processing, and the like. The method of installing the control program and the like in the reader/writer 30 is not limited.

The controller 42 controls the operation of each block of the reader/writer 30. The controller 42 has a hardware configuration such as a CPU and memories (RAM and ROM) that are necessary for a computer. Various types of processing are performed in such a manner that the CPU loads the control program and the like stored in the storage unit 41, into the RAM and executes the control program and the like.

For example, a PLD such as a FPGA and other devices such as an ASIC may be used as the controllers 42.

In this embodiment, the CPU of the controller 23 performs the program according to this embodiment, such that a code reading unit 43, a peripheral information detecting unit 44, and a communication operation control unit 45 are realized as functional blocks, and the information processing method according to this embodiment is performed. It should be noted that in order to realize each block, dedicated hardware such as an integrated circuit (IC) may be used as appropriate.

The code reading unit 43 reads information stored in the code image 2 on the basis of the image information of the code image 2 obtained by the camera 33.

The peripheral information detecting unit 44 detects peripheral information on the basis of the sound obtained by the microphone 32, the image captured by the camera 33, and the detection result of the sensor unit 40. For example, as peripheral information, sound information regarding ambient sounds, optical information regarding light (including color information regarding color), image information regarding an image, and motion information regarding motion of an object can be detected. A configuration or algorithm capable of detecting at least one of them may be employed. In this embodiment, a detecting unit is realized by the peripheral information detecting unit 44.

The communication operation control unit 45 is capable of controlling a communication operation related to the communication of the reader/writer 30. In this embodiment, communication-related operations of the NFC communication unit 36 that functions as a communication unit and the controller 42 that controls the code reading unit 43 are controlled on the basis of the detected peripheral information. It should be noted that the control on the communication-related operations includes control on the communication mode. The communication operation control unit 45 controls the communication-related operations of the code reading unit 43 and the NFC communication unit 36 on the basis of the detected peripheral information.

The specific algorithm performed by the code reading unit 43, the peripheral information detecting unit 44, and the communication operation control unit 45 is not limited, and any algorithm may be used. For example, any machine learning algorithm using a DNN or the like may be used. For example, by using artificial intelligence (AI) or the like for performing deep learning, it is possible to improve the accuracy of reading a code, detecting peripheral information, and controlling a communication operation.

In this embodiment, the reader/writer 30 functions as the information processing apparatus according to the present technology. It should be noted that as viewed from the communication terminal 10 as a communication partner, the reader/writer 30 functions as the external apparatus according to the present technology.

[Reader/Writer Control]

Figure 4:
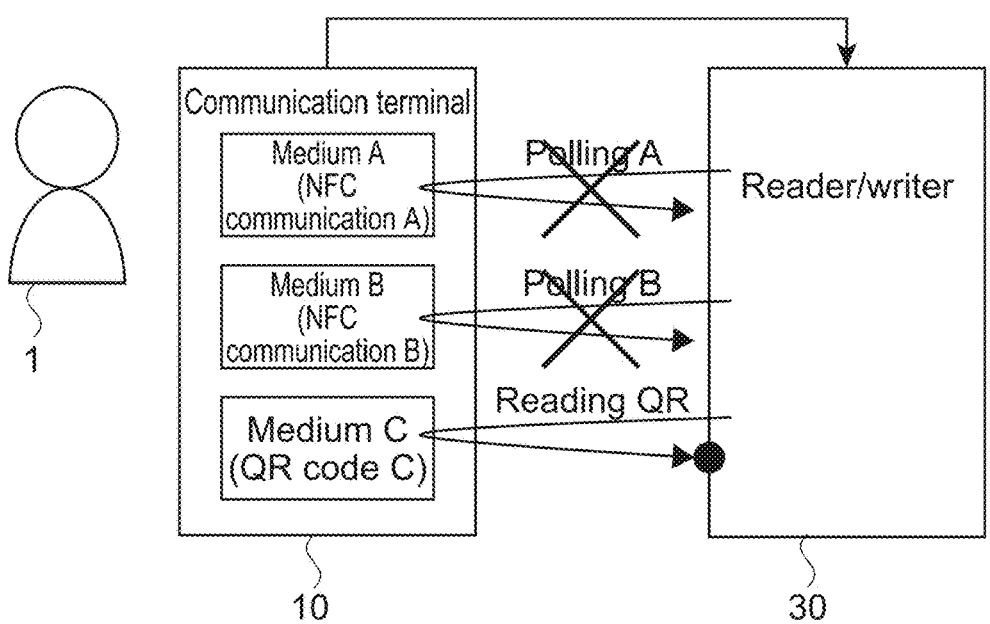
FIG. 4 A schematic diagram for describing the outline of data communication by this communication system.
Figure 5:
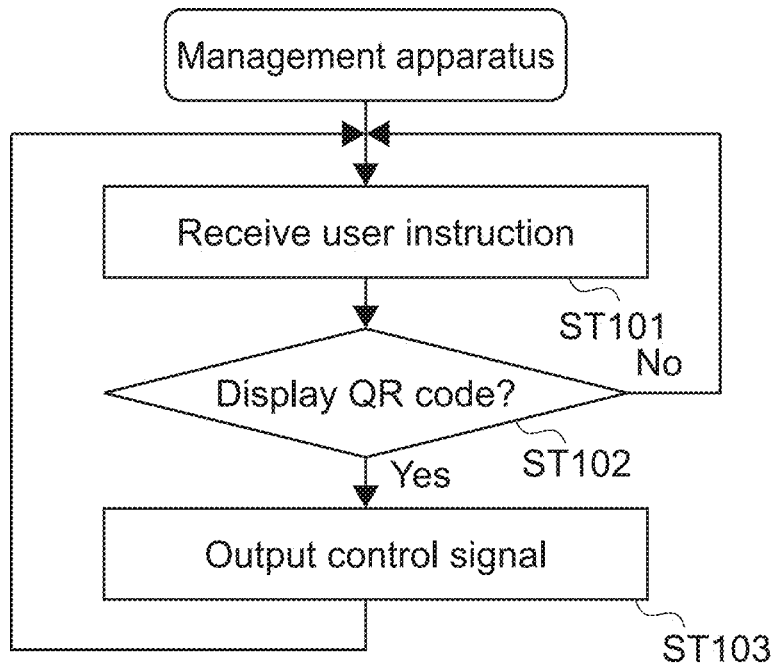
FIG. 5 A flowchart showing an operation example of the communication terminal.

FIG. 4 is a schematic diagram for describing the outline of data communication by the communication system 100. FIG. 5 is a flowchart showing an operation example of the communication terminal 10.

The media A to C shown in FIG. 4 mean different types of media for performing communication between the communication terminal 10 and the reader/writer 30, and it can also be said that they are different types of communication functions. For example, it is assumed that "(Medium A): NFC communication A using the IC card A issued by the business operator A", "(Medium B): NFC communication B using the IC card B issued by the business operator B", "(Medium C): communication C using a QR code C" can be each performed between the communication terminal 10 and the reader/writer 30.

Hereinafter, the NFC communication A will be sometimes referred to as communication by the medium A or reading of the medium A. NFC communication B will be sometimes referred to as communication by the medium B or reading of the medium B. Further, the communication C using the QR code C will be sometimes referred to as communication by the medium C or reading of the medium C.

For example, it is assumed that the user 1 inputs an instruction to display the QR code C, which is the medium C, via the touch panel 14, voice input, or the like. In this case, as shown in FIG. 5, the instruction determining unit 24 first receives an instruction from the user (Step 101) and determines whether or not the contents of the received instruction is an instruction to display the QR code C (Step 102).

In a case where the received instruction is not an instruction to display the QR code C (No in Step 102), the processing returns to Step 101. In a case where the received instruction is an instruction to display the QR code C (Yes in Step 102), the control signal output unit 25 outputs a control signal for controlling the communication operation of the reader/writer 30.

It should be noted that in the example shown in FIG. 5, in a case where the instruction to display the QR code C is received, the control signal is output in Step 103. The present technology is not limited thereto, and arbitrary other instruction related to communication using the QR code may be set as a trigger for outputting a control signal. For example, an instruction to start an application for performing communication using the QR code, an instruction to select execution of communication in the application, or the like may be set as the trigger for outputting the control signal.

In Step 103, the control signal output unit 25 outputs to the reader/writer 30 a control signal for causing the reader/writer 30 to perform an operation related to communication using the QR code and regulating the operation related to the NFC communication. For example, control signals for causing communication using the QR code C displayed on the touch panel 14 to be performed and regulating the output of a polling signal A for performing the NFC communication A and a polling signal B for performing the NFC communication B are output.

It should be noted that it is possible to output only a control signal for regulating the operation related to the NFC communication to the reader/writer 30 in a state in which it can read the QR code. That is, the output of the control signal for to causing the operation related to communication using the QR code to be performed and regulating the operation related to the NFC communication includes the output of only the control signal for regulating the operation related to the NFC communication. Further, the regulation of the operation includes not only the stop of the operation, reduction of the operation frequency, and the like.

As a control signal, for example, a signal that can be received by the reader/writer 30 at a predetermined distance from the communication terminal 10 is used. In this embodiment, a signal that can be received by the reader/writer 30 at a distance longer than the arrival distance of the polling signal A and B output from the reader/writer 30 is used. In general, the communication distance of the NFC communication is set to about 10 cm, and the predetermined distance is set such that the signal can be received at a distance longer than it. As a matter of course, the present technology is not limited thereto, and a desired distance for controlling the reader/writer 30 may be arbitrarily set.

In this embodiment, as a control signal, an audio signal output from the speaker 11 and an optical signal output from the illumination unit 19 is used. As a matter of course, a configuration in which only one of the audio signal or the optical signal is output may be employed.

For example, a preset frequency, intermittent sound, volume, and a signal obtained by combining all of them are output as the audio signal. As a matter of course, the present technology is not limited thereto, and any audio signal may be used.

For example, preset light flashing, light luminance, brightness of color, color change, color distribution, color occupancy, and a signal combining all of them are output as the optical signal. As a matter of course, the present technology is not limited thereto, and any optical signal may be used. It should be noted that the optical signal is not limited to visible light.

On the reader/writer 30 side, the audio signal and the optical signal, which are control signals output from the communication terminal 10, are received by the microphone 32 and the camera 33. The communication operation control unit 45 determines whether or not the audio signal and the optical signal which are control signals from the communication terminal 10 have been received on the basis of the peripheral information detected by the peripheral information detecting unit 44. It also corresponds to determining whether or not the audio signal and the optical signal which are control signals have been output from the communication terminal 10 on the basis of the peripheral information.

It should be noted that in order to perform the determination, information about the control signal is stored in advance in the storage unit 41. The specific format and the like of the information for determining the reception of the control signal (output of the control signal) are not limited. It should be noted that in the present communication system 100, in addition to the sound signal and the optical signal output from the communication terminal 10, detection of a predetermined motion and recognition of a predetermined image are defined for controlling the communication operation of the reader/writer 30. This point will be described later.

The communication operation of the reader/writer 30 is controlled in a case where the communication operation control unit 45 determines that the reception of the control signal (output of the control signal) has been performed on the basis of the detected peripheral information. In this example, the operation related to the communication using the QR code is performed and the operation related to the NFC communication is regulated. That is, the reading of the QR code C displayed on the touch panel 14 is performed and the output of the polling signal A for performing the NFC communication A and the output of the polling signal B for performing the NFC communication B are regulated. As a matter of course, in a state in which the QR code can be read, only the operation related to the NFC communication may be regulated.

Accordingly, as shown in FIG. 4, before the polling signals A and B reach the communication terminal 10, the output of each of the polling signals A and B is regulated. As a result, it is possible to prevent the display of the QR code C from being stopped due to polling from the reader/writer 30 in the state in which the QR code C is displayed. That is, the communication terminal 10 can be prevented from making behaviors unintended by the user 1 due to the influence of polling.

Figure 6:
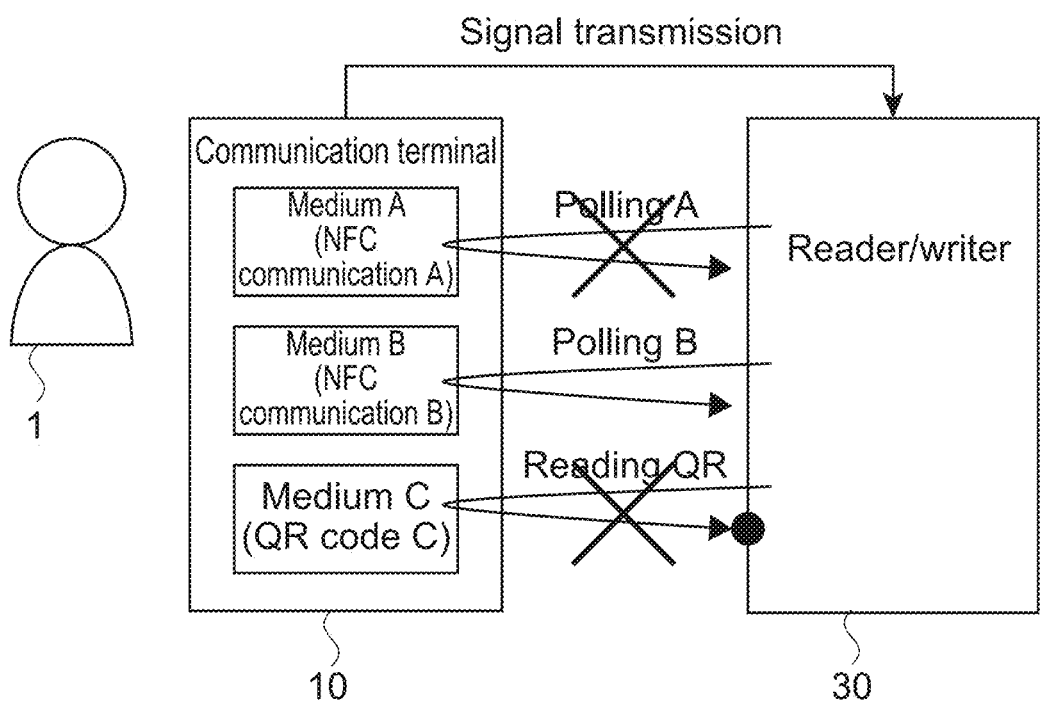
FIG. 6 A flowchart showing another operation example of the communication terminal.
Figure 7:
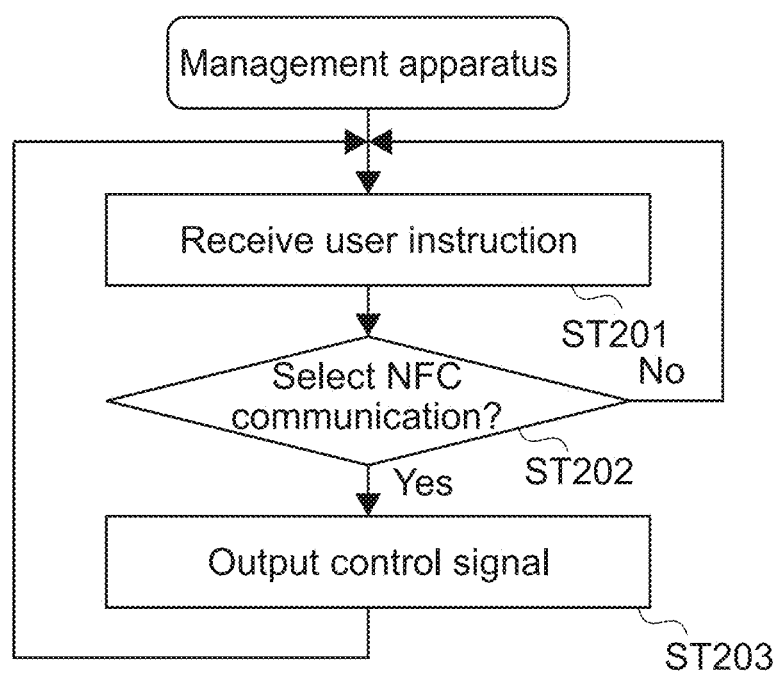
FIG. 7 A flowchart showing another operation example of the communication terminal.

FIGS. 6 and 7 are flowcharts showing another operation example of the communication terminal 10.

For example, it is assumed that the user 1 inputs an instruction to select execution of the NFC communication B, which is the medium B, via the touch panel 14, the voice input, or the like. In this case, as shown in FIG. 7, the instruction determining unit 24 first receives the user's instruction (Step 201) and determines whether or not the contents of the received instruction is an instruction to select to perform the NFC communication B (Step 202).

In a case where the received instruction is not an instruction to select to perform the NFC communication B (No in Step 202), the processing returns to Step 201. In a case where the received instruction is an instruction to select to perform the NFC communication B (Yes in Step 202), the control signal output unit 25 outputs a control signal for controlling the communication operation of the reader/writer 30.

It should be noted that the instruction for selecting execution of the NFC communication B includes any instruction such as an instruction to start the application for performing the NFC communication B and an instruction to select the IC card (electronic money), for example. That is, an arbitrary instruction to perform the NFC communication B may be set as the trigger for outputting the control signal.

In Step 203, the control signal output unit 25 outputs a control signal for causing the reader/writer 30 to perform the operation related to the NFC communication B and regulating the operation related to the NFC communication A and the operation related to the communication using the QR code. For example, a control signal for causing the output of the polling signal B for performing the NFC communication B to be performed, reading the QR code C displayed on the touch panel 14, and regulating the output of the polling signal A for performing the NFC communication A is output.

It should be noted that in a state in which the polling signal B for performing the NFC communication B is being performed, there may be a case where a control signal for regulating both the reading of the QR code C displayed on the touch panel 14 and the output of the polling signal A for performing the NFC communication A is output. That is, regarding the output of the polling signal B, the operation is not particularly controlled, and the polling signal B may be continued as it is.

The distance at which the control signal can be received, the type of control signal, and the like are the same as those described above.

On the reader/writer 30 side, the communication operation control unit 45 controls the communication operation of the reader/writer 30 on the basis of the detected peripheral information. In this example, the operation related to the NFC communication B is performed, and the operation related to the NFC communication A and the operation related to the communication using the QR code are regulated. That is, the output of the polling signal B for performing the NFC communication B is performed, and the output of the polling signal A for performing the NFC communication A and the reading of the QR code C displayed on the touch panel 14 are regulated.

Accordingly, the output of the polling signal A is regulated before the polling signal A reaches the communication terminal 10 as shown in FIG. 6. Further, the reading of the QR code is regulated before the communication terminal 10 is brought close to the reader/writer 30. As a result, the NFC communication B can be properly performed in response to the polling signal B. For example, it is possible to prevent the NFC communication A unintended by the user 1 from being performed in response to the polling signal A. Further, it is also possible to prevent an code image unintended by the user 1 from being read or the like.

As described above, in this embodiment, it is possible to actively control the reader/writer 30 from the communication terminal 10 by the control signal with respect to the reader/writer 30 capable of communication by a plurality of media. As a result, the medium to be communicated can be clarified, and it is possible to improve the usability of the user 1 for communication with the reader/writer 30.

It should be noted that regarding the execution of the NFC communication, immediately before the communication is performed, the user 1 may not input an instruction related to the NFC communication to the communication terminal 10. For example, there may be a case where the type of IC card (type of electronic money) is set in advance and no particular instructions are input upon communication.

For example, in view of such a point, a configuration in which only the functions described with reference to FIGS. 4 and 5 are mounted may be employed. As a matter of course, the functions described with reference to FIGS. 4 and 5 and the functions described with reference to FIGS. 6 and 7 may be combined and mounted as appropriate. In this case, a processing flow of proceeding to Step 202 shown in FIG. 7 in a case where the result of Step 102 in FIG. 5 is negative is conceivable. As a matter of course, the present technology is not limited thereto, and any algorithm and the like may be set.

FIGS. 8 to 13 are flowcharts showing operation examples of the reader/writer 30. In this embodiment, the communication operation control unit 45 generates a control signal for controlling the operation related to the communication of the reader/writer 30 on the basis of the peripheral information detected by the peripheral information detecting unit 44. The communication operation of the reader/writer 30 is controlled on the basis of the generated control signal.

In this embodiment, as the control signal, an audio signal, an optical signal, a motion signal, and an image signal are generated. A configuration in which at least one of these control signals is generated may be arbitrarily employed.

Figure 9:
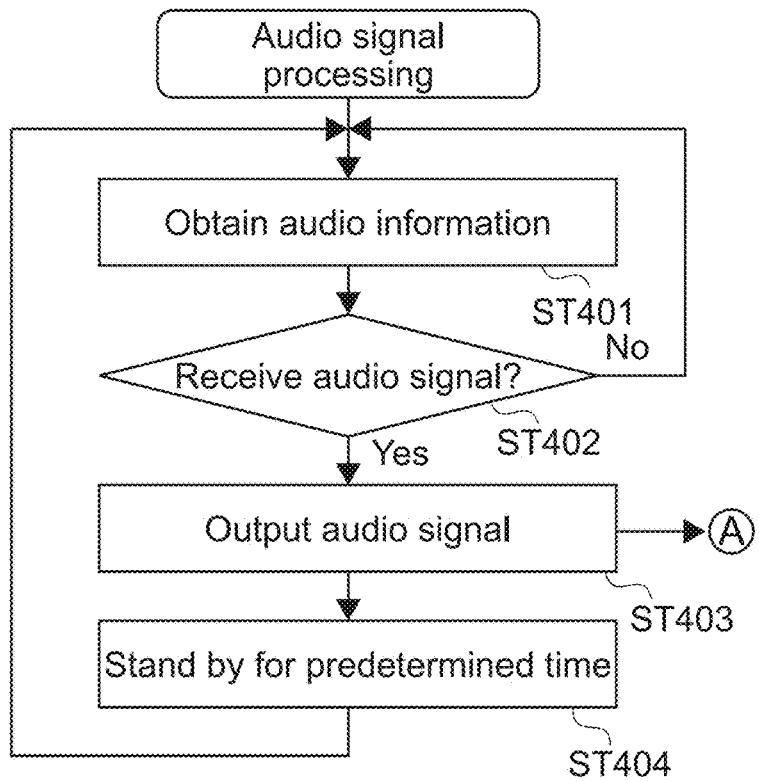
FIG. 9 A flowchart showing an operation example of the reader/writer.

As shown in FIG. 9, an audio signal processing block of the communication operation control unit 45 obtains audio information detected as the peripheral information and monitors whether or not the audio signal output from the communication terminal 10 is received in Steps 401 and 402.

Figure 8:
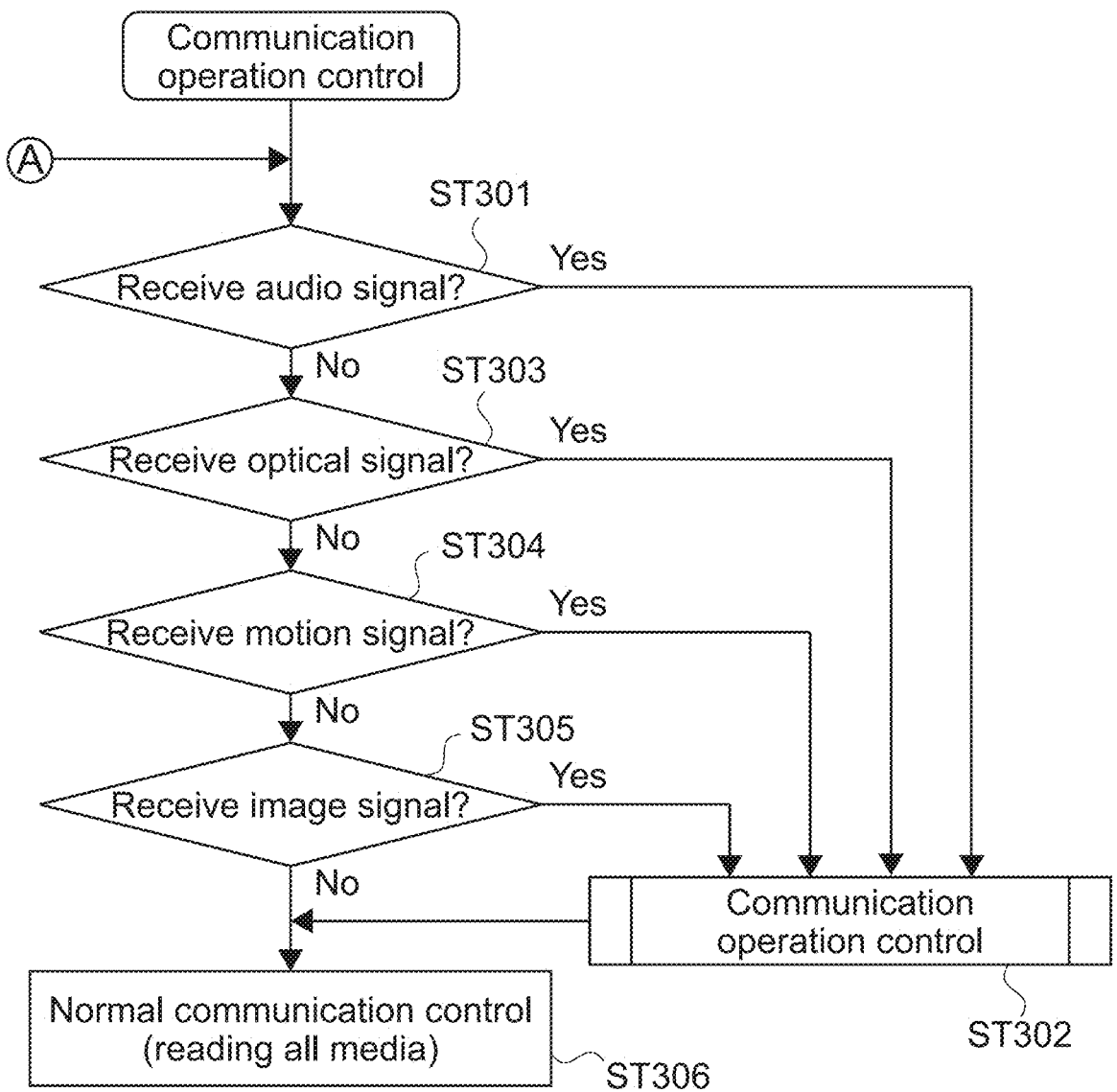
FIG. 8 A flowchart showing an operation example of the reader/writer.

In a case where the audio signal output from the communication terminal 10 is received (Yes in Step 402), the audio signal is output to a communication operation controlling block that performs the processing shown in FIG. 8 as the control signal (Step 403). It should be noted that any signal including information indicating that the audio signal output from the communication terminal 10 has been received may be used. After the audio signal is output, the processing stands by for a predetermined time (Step 404) and returns to Step 401. The specific duration of the predetermined standby time is not limited, and may be arbitrarily set.

Figure 10:
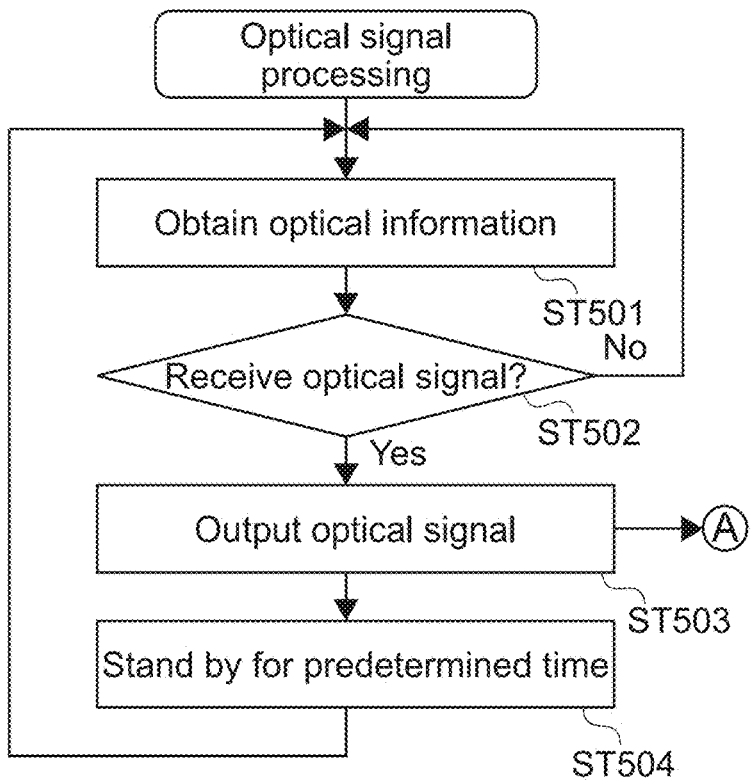
FIG. 10 A flowchart showing an operation example of the reader/writer.

As shown in FIG. 10, an optical signal processing block of the communication operation control unit 45 obtains optical information detected as the peripheral information and monitors whether or not the optical signal output from the communication terminal 10 is received (Steps 501 and 502).

In a case where the optical signal output from the communication terminal 10 is received (Yes in Step 502), the optical signal is output as the control signal to the communication operation controlling block (Step 503). It should be noted that any signal including information indicating that the optical signal output from the communication terminal 10 has been received may be used. After the optical signal is output, the processing stands by for a predetermined time (Step 504) and returns to Step 501.

Figure 11:
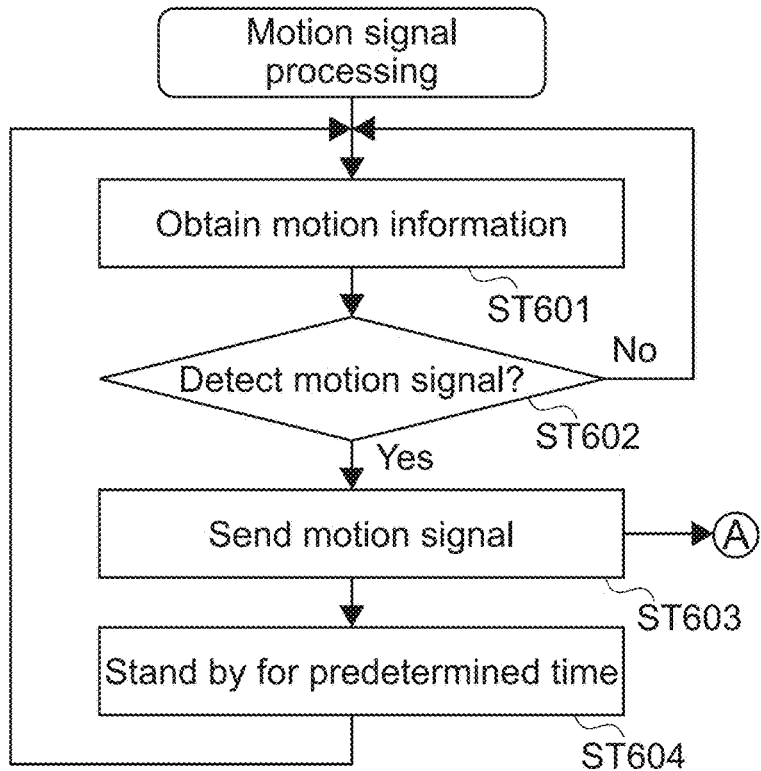
FIG. 11 A flowchart showing an operation example of the reader/writer.

As shown in FIG. 11, a motion signal processing block of the communication operation control unit 45 obtains motion information detected as the peripheral information (Step 601). Then, it is monitored whether or not a predetermined motion is detected (Step 602).

For example, it is determined whether or not a predetermined motion such as the user 1 rotating a hand holding the communication terminal 10, shaking it up and down, shaking it to the left and right, or the like. For example, the motion can be detected on the basis of motion tracking of an object or the like, though not limited to this detection method. An arbitrary detection technique may be employed. Further, the specific motion to be determined is not also limited, and may be arbitrarily set.

In a case where a predetermined motion is detected (Yes in Step 602), a motion signal regarding the detected motion is output to the communication operation controlling block as the control signal (Step 603). It should be noted that an arbitrary signal including information indicating that a predetermined motion has been detected may be used. After the motion signal is output, the processing stands by for a predetermined time (Step 604) and returns to Step 601.

Figure 12:
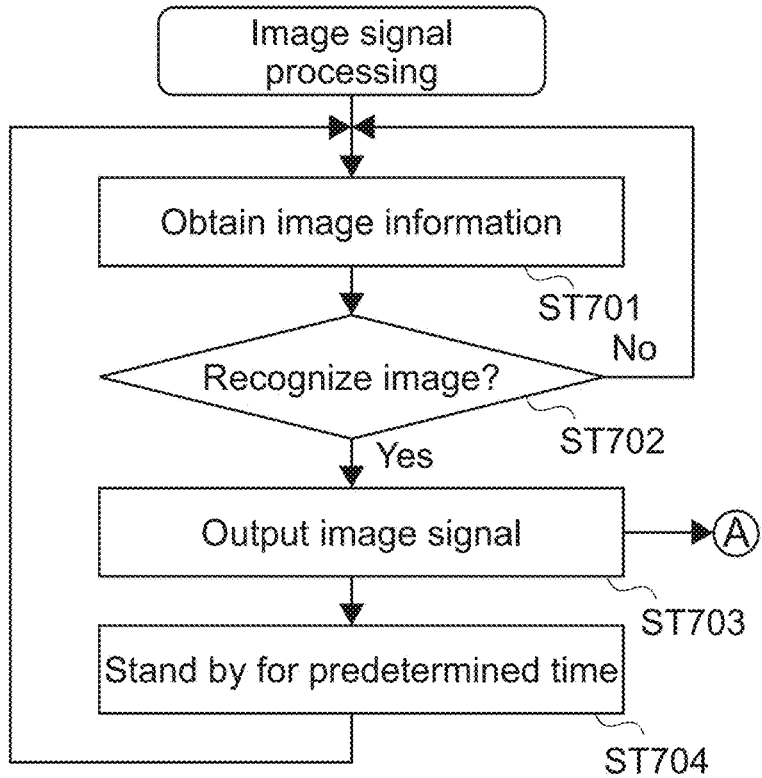
FIG. 12 A flowchart showing an operation example of the reader/writer.

As shown in FIG. 12, an image signal processing block of the communication operation control unit 45 obtains the image information detected as the peripheral information (Step 701). Then, it is monitored whether or not a predetermined image has been recognized (Step 702).

For example, a pattern, a specific character, or the like on the surface of an IC card issued by each business operator is set as a predetermined image to be recognized. As a matter of course, the present technology is not limited thereto, and an arbitrary image may be set. Further, the image may be recognized on the basis of the entire image or may be recognized on the basis of the color arrangement, outline, or the like of the image.

It should be noted that the image may be an image printed on a medium such as paper or may be an image printed on an IC card or the like. Further, it may be an image displayed on an electronic apparatus including a display unit. As a matter of course, it may be an image displayed on the touch panel 14 of the communication terminal 10.

In a case where a predetermined image is recognized (Yes in Step 702), an image signal of the recognized image is output to the communication operation controlling block as the control signal (Step 703). It should be noted that any signal including information indicating that a predetermined image has been recognized may be used. After the image signal is output, the processing stands by for a predetermined time (Step 704) and returns to Step 701.

It should be noted that the audio signal processing block, the optical signal processing block, the motion signal processing block, and the image signal processing block may be implemented as other functional blocks not included in the communication operation control unit 45.

As shown in FIG. 8, in the communication operation controlling block, it is determined whether or not the audio signal which is the control signal is received from the audio signal processing block (Step 301). In a case where the audio signal is received (Yes in Step 301), the communication operation control is performed (Step 302).

In a case where the audio signal is not received (No in Step 302), it is determined whether an optical signal which is the control signal is received from the optical signal processing block (Step 303). In a case where the optical signal is received (Yes in Step 303), the communication operation control is performed (Step 302).

In a case where the optical signal is not received (No in Step 303), it is determined whether or not a motion signal that is the control signal is received from the motion signal processing block (Step 304). In a case where the motion signal is received (Yes in Step 304), the communication operation control is performed (Step 302).

In a case where the motion signal is not received (No in Step 304), it is determined whether or not an image signal which is the control signal is received from the image signal processing block (Step 305). In a case where the image signal is received (Yes in Step 305), the communication operation control is performed (Step 302).

In a case where the image signal is not received (No in Step 306), normal communication control is performed (Step 304). It should be noted that the order of determination processing for the "audio signal", the "optical signal", the "motion signal", and the "image signal" is not limited and may be set as appropriate. Further, the determination processing may be performed in parallel.

The normal communication control is control that enables all media to be read, and can also be referred to as normal read control of the media. For example, in a case where the Media A to C illustrated in FIG. 4 are described as an example, the communication operation of the reader/writer 30 is controlled such that all of "(Medium A): NFC communication A using the IC card A issued by the business operator A", "(Medium B): NFC communication B using the IC card B issued by the business operator B", "(Medium C): communication C using the QR code C" can be performed.

For example, a loop of output of the polling signal A, output of the polling signal B, and reading of the QR code is performed at predetermined intervals. Alternatively, the reading of the QR code is always possible, and the output of the polling signal A and the output of the polling signal B are alternately performed at predetermined intervals. Alternatively, the output of the polling signal A, the output of the polling signal B, and the reading of the QR code may be performed simultaneously. Additionally, arbitrary control may be performed as the normal communication control.

It should be noted that in the initial state of the reader/writer 30, the normal communication control is performed. As a matter of course, the present technology is not limited thereto, and a state in which only communication with a specific medium is possible may be set as the initial state.

Figure 13:
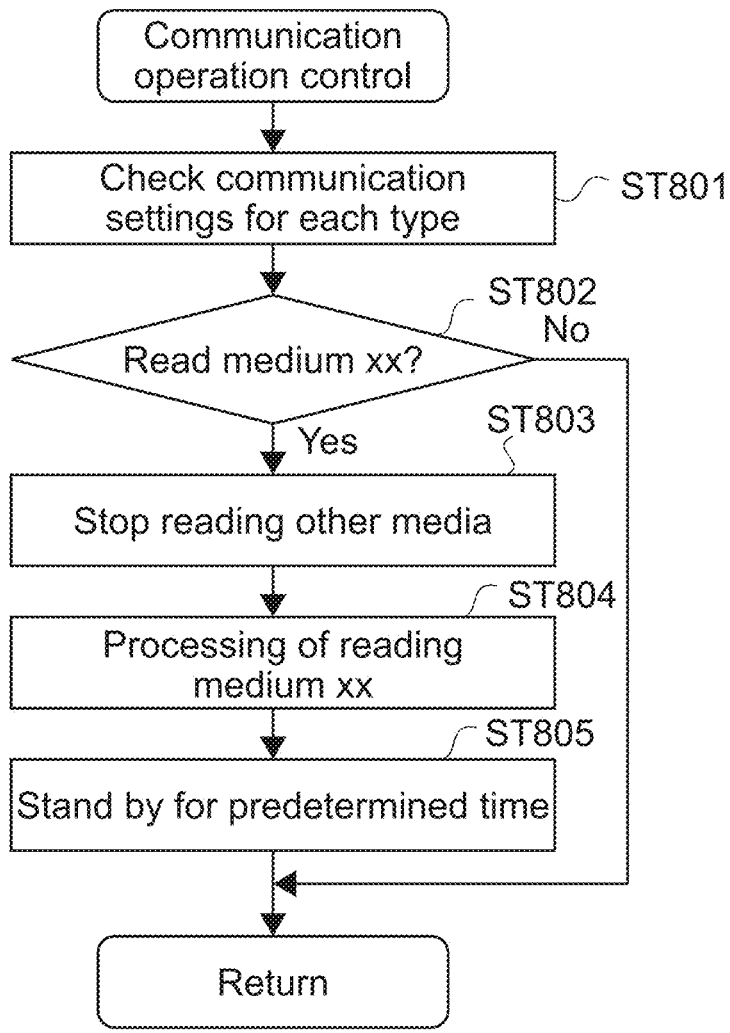
FIG. 13 A flowchart showing an operation example of the reader/writer.

FIG. 13 is a flowchart showing an example of the communication operation control in Step 302. The communication operation control can also be referred to as medium reading control.

First, a communication setting for each type defined in advance is confirmed (Step 801). The communication setting for each type is information indicating the control contents of the communication operation defined for each of the "audio signal," the "optical signal," the "motion signal," and the "image signal" received in Steps 301 and 303 to 305 of FIG. 8. The communication setting for each type can also be referred to as a reading setting for each type.

For example, by taking the media A to C illustrated in FIG. 4 as an example, the following communication setting for each type is defined.

"Audio Signal"

Audio signal 1: reading of the QR code C, stop of the polling signals A and B

Audio signal 2: reading stop of the QR code C, output of the polling signal A (performing the NFC signal A), stop of the polling signal B Audio signal 3: reading stop of the QR code C, stop of the polling signal A, output of the polling signal B (performing the NFC signal B)

"Optical Signal"

Optical Signal 1: reading of the QR Code C, stop of the polling signals A and B

Optical signal 2: reading stop of the QR code C, output of the polling signal A (performing the NFC signal A), stop of the polling signal B Optical signal 3: reading stop of the QR code C, stop of the polling signal A, output of the polling signal B (performing the NFC signal B)

"Motion Signal"

Motion signal 1: reading the QR code C, stop of the polling signals A and B

Motion signal 2: reading stop of the QR code C, output of the polling signal A (performing the NFC signal A), stop of the polling signal B Motion signal 3: reading stop of the QR code C, stop of the polling signal A, output of the polling signal B (performing the NFC signal B)

"Image"

Image signal 1: reading of the QR code C, stop of the polling signals A and B

Image signal 2: reading stop of the QR code C, output of the polling signal A (performing the NFC signal A), stop of the polling signal B Image signal 3: reading stop of the QR code C, stop of the polling signal A, and output of the polling signal B (performing the NFC signal B)

For example, as a result of confirming the communication setting for each type as described above, it is determined whether or not reading of the medium to be read can be performed (Step 802). In a case where the reading of the medium to be read cannot be performed (No in Step 802), the communication operation control ends.

In a case where the reading of the medium to be read can be performed (Yes in Step 802), the reading of the other media is stopped in accordance with the communication setting for each type (Step 803). Then, the medium to be read is read (Step 804).

For example, in a case where the "audio signal 1" is received, the reading of the QR code C (reading of the medium C) is performed, and the NFC communication A and B (reading of the media A and B) is stopped. Therefore, the polling signals A and B are stopped.

In a case where the "optical signal 2" is received, the reading of the QR code C (reading of the medium C) and the NFC communication B (reading of the medium B) are stopped, and the NFC communication A (reading of the medium A) is performed. Therefore, the polling signal B is stopped.

It should be noted that the setting of the communication control for each type is not limited, and it may be set arbitrarily. For example, a communication control setting for each type may be generated as appropriate on the basis of the peripheral information or the like.

After the reading of the medium to be read is performed, the processing stands by for a predetermined time and then the communication operation control ends (Step 805).

As described above, in the communication terminal 10 according to this embodiment, the control signal for controlling the operation related to the communication of the reader/writer 30 is output on the basis of the instruction related to the communication using the code image 2 with the reader/writer 30. Accordingly, by the user 1 inputting the instruction, it is possible to control the operation of the reader/writer 30. As a result, high usability can be achieved for the communication with the reader/writer 30.

For example, by the operation of displaying the code image 2, the communication operation of the reader/writer 30 can be controlled, and the output of the polling signal can be stopped. Therefore, it is possible to control the communication operation of the reader/writer 30 only by inputting the previous operation without inputting a new operation and the like. This provides very high usability.

Further, in the reader/writer 30 according to this embodiment, the operations regarding the NFC communication unit 36 and the code reading unit 43 communicable with the communication terminal 10 are controlled on the basis of the detected peripheral information. Accordingly, usability of the user 1 using the communication terminal 10 can be improved.

The user 1 can select a medium to be read without operating the reader/writer 30. Further, the reader/writer 30 can be controlled without performing a registration operation with the reader/writer 30 or the like. Accordingly, high usability can be achieved.

In a case where the reader/writer 30 includes a microphone, a light-receiving sensor, or the like, active information can be easily sent to the reader/writer 30 from the communication terminal 10 by using communication based on the audio information or optical information. This makes existing hardware mechanisms available, which can reduce the costs.

For example, the code image 2 such as the QR code is moved closer to the reader/writer 30 from a slightly distant position. In this case, it is possible to receive the control signal as an optical signal containing black and white colors. Therefore, it is possible to control the communication operation of the reader/writer 30 before the polling signal of the NFC communication arrives. That is, the display itself of the code image 2 may also be included in the output of the control signal.

Other Embodiments

The present technology is not limited to the above-mentioned embodiment and various other embodiments can be made.

Figure 14:
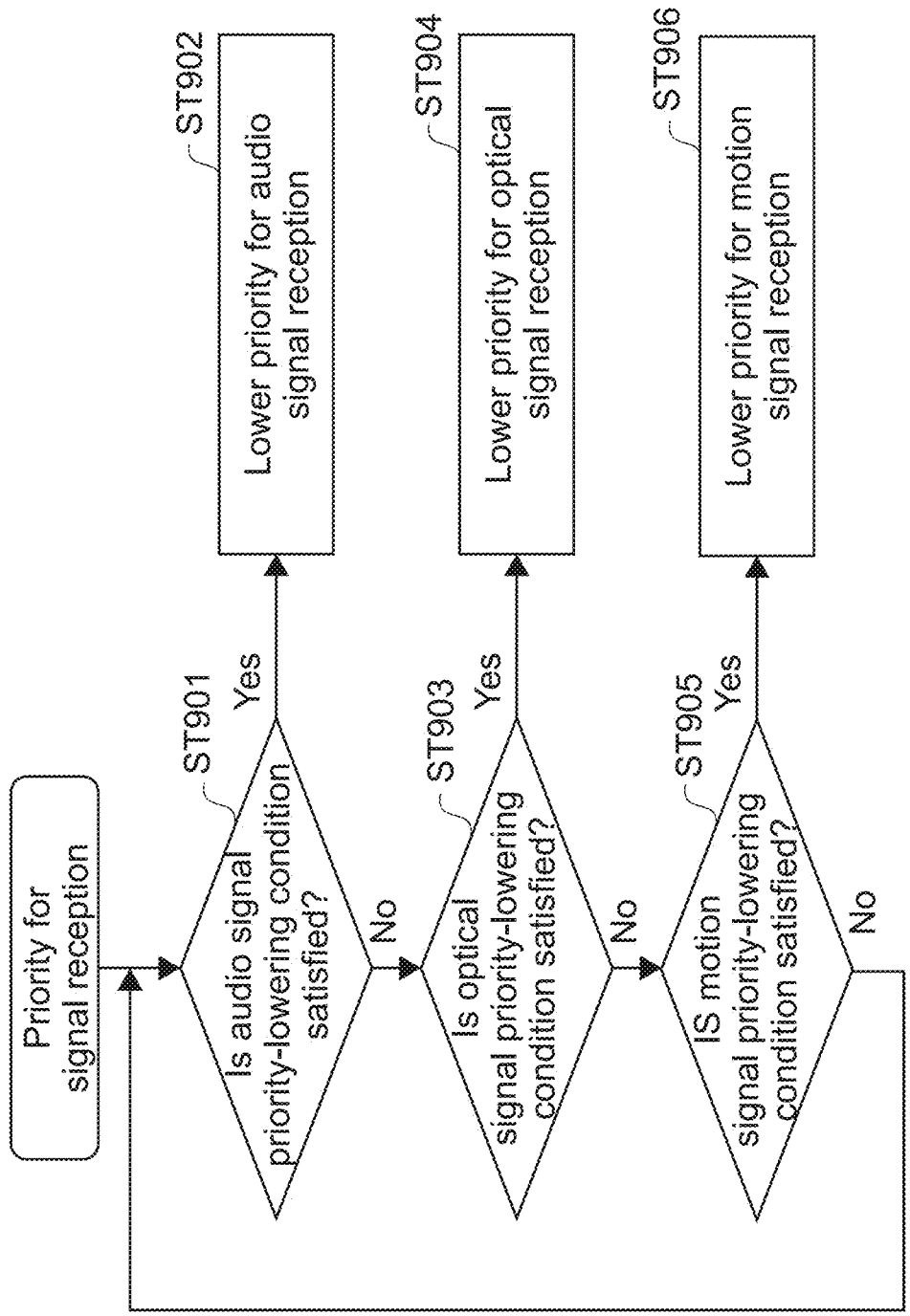
FIG. 14 A flowchart showing an example of priority of control signals.

FIG. 14 is a flowchart showing an example of priority of the control signals.

For example, depending on the surrounding conditions such as the environment in which the reader/writer 30 is placed, there is a possibility that erroneous reception of the control signals (audio signal, optical signal) output from the communication terminal 10 occurs. Further, there is also a possibility that the user's motion may be falsely detected.

In order to cope with such problems, it is also possible to set a degree of priority for each of the audio signal, the optical signal, the motion signal, and the image signal generated as the control signals illustrated in FIGS. 9 to 12 on the basis of the peripheral information detected by the peripheral information detecting unit 44 and to control the communication operation of the reader/writer 30 on the basis of the set degree of priority.

Hereinafter, the description will be given by taking a case where a degree of priority is set to the audio signal, the optical signal, and the motion signal as an example with reference to FIG. 14. As a matter of course, the degree of priority may be set for other signals generated as control signals, such as image information.

In this embodiment, the communication operation control unit 45 determines whether a priority-lowering condition of the audio signal is satisfied on the basis of the peripheral information detected by the peripheral information detecting unit 44 (Step 901).

The priority-lowering condition is set in advance as a "lowering condition" and a "setting-changing condition". It should be noted that the specific contents of the "lowering condition" and the "setting-changing condition" are not limited. For example, it may be changed in accordance with the performance and type of the sensor such as the camera 33 mounted on the reader/writer 30.

For example, the priority-lowering condition of the audio signal is set such that the "lowering condition" is 100 dB or more and the "setting-changing condition" is a case where the "lowering condition" occurs more than once during one minute and continues for more than five minutes. As an environment satisfying such the "lowering condition" and the "setting-changing condition", for example, a case where the reader/writer 30 is installed in a place where sound pressure or strong sound is continuously generated is conceivable.

In a case where the priority-lowering condition of a voice signal of the audio signal is satisfied (Yes in Step 901), the priority of the audio signal is lowered (Step 902).

The degree of priority (priority) is determined, for example, in the determination step of Step 402 shown in FIG. 9. For example, in a case where the degree of priority is high, when it is determined that the audio signal output from the communication terminal 10 is received once, the processing proceeds to Step 403. On the other hand, in a case where the degree of priority is low, unless it is determined that the audio signal output from the communication terminal 10 is received a plurality of times (for example, three times), the processing does not proceed to Step 403. For example, such processing is performed.

As a matter of course, the present technology is not limited to such processing, and in a case where the degree of priority is lower than a predetermined threshold, processing of not performing the audio signal processing shown in FIG. 9 or the like may be set. That is, in a case where the degree of priority is lower than the predetermined threshold, the communication operation control based on the audio signal is not performed, for example.

In a case where the priority-lowering condition of the audio signal is not satisfied (No in Step 901), it is determined whether the priority-lowering condition of the optical signal is satisfied on the basis of the peripheral information detected by the peripheral information detecting unit 44 (Step 903).

For example, the priority-lowering condition of the optical signal is set such that the "lowering condition" is 50 cd or more or 1000 lm or more and the "setting-changing condition" is a case where the "lowering condition" occurs more than once during one minute and continues for more than five minutes.

As the environment satisfying such "lowering condition" and "setting-changing condition", for example, a case where the reader/writer 30 is installed at a place where changes in luminance, light flashing, brightness of color, color, and the like are continuously occurring, such as near a television or monitor is conceivable.

In a case where the priority-lowering condition of the voice signal of the optical signal is satisfied (Yes in Step 903), the priority of the optical signal is lowered (Step 904). It should be noted that as described for the audio signal, the degree of priority (priority) is reflected to the determination step of Step 502 shown in FIG. 10, for example.

In a case where the priority-lowering condition of the optical signal is not satisfied (No in Step 903), it is determined whether or not the priority-lowering condition of the motion signal is satisfied on the basis of the peripheral information detected by the peripheral information detecting unit 44 (Step 905).

For example, as an environment satisfying the "lowering condition" and the "setting-changing condition" which are set such that the "lowering condition" is detecting a motion 500 times or more and the "setting-changing condition" is a case where the "lowering condition" occurs once or more during one minute and continues for more than five minutes, for example, a case where the object identification rate is high at all times, such as a place where a person or an object passes in front of the reader/writer 30 is conceivable.

In a case where the priority-lowering condition of the voice signal of the motion signal is satisfied (Yes in Step 905), the priority of the motion signal is lowered (Step 906). It should be noted that as described for the audio signal, the degree of priority (priority) is reflected to the determination step of Step 602 shown in FIG. 11, for example.

In a case where the priority-lowering condition of the motion signal is not satisfied (No in Step 903), the processing returns to Step 901.

It should be noted that in a case where for each control signal, the priority-lowering condition is satisfied and the priority of signal reception is lowered, a "reset condition" for resetting the priority may be set. For example, as the "reset condition", a condition such as whether or not a predetermined time (e.g., five minutes or the like) has elapsed since the priority was lowered is set. Accordingly, it is possible to sufficiently cope with changes in the environment and the like, and it is possible to perform continuously high-precision communication operation control based on each control signal.

It should be noted that the order of lowering the priority, the "lowering condition", "setting-changing condition", and the "reset condition" are not limited. For example, the numerical value or unit of the "lowering condition" may be set as appropriate in accordance with the conditions of the place where the reader/writer 30 is installed.

In the above, the case where the audio signal which is the control signal is output by the communication terminal 10 has been described. Voice uttered by the user 1 may be used as the control signal for controlling the communication operation of the reader/writer 30.

By linking a computer mounted on the communication terminal 10 and the reader/writer 30 with another computer (cloud system) communicable via a network or the like, the information processing method according to the present technology may be performed and the information processing apparatus according to the present technology may be constructed.

It should be noted that an example of a program for causing the information processing method according to the present technology to be performed will be described below.

A program that causes a computer system to execute:
a step of receiving an instruction related to communication using a code image with an external apparatus; and
a step of outputting a signal for controlling an operation related to communication of the external apparatus on the basis of the received instruction related to the communication.

A program that causes a computer system to execute:
a step of detecting peripheral information; and
a step of controlling an operation related to communication of a communication unit capable of communicating with an external apparatus on the basis of the detected peripheral information.

The information processing method and the program according to the present technology can be executed not only in a computer system configured by a single computer but also in a computer system in which a plurality of computers cooperate each other. It should be noted that in the present disclosure, the system means a set of components (such as apparatuses and modules (parts)) and it does not matter whether all of the components are in a single casing. Therefore, a plurality of apparatuses housed in separate casings and connected to one another via a network and a single apparatus having a plurality of modules housed in a single casing are both the system.

Execution of the information processing method and the program according to the present technology by the computer system includes, for example, both a case where reception of the instruction related to the communication with the external apparatus using the code image, output of the signal for controlling the operation related to communication of the external apparatus, detection of the peripheral information, control of the operation related to the communication, and the like are performed by a single computer and a case where the respective processes are performed by different computers. Further, performing the respective processes by a predetermined computer includes causing another computer to perform some or all of those processes and obtaining results thereof.

That is, the information processing method and the program according to the present technology can also be applied to a cloud computing configuration in which a single function is shared and commonly processed by a plurality of apparatuses via a network.

The information processing apparatus, the signal output unit, the control flow of the controller, and the like described above with reference to the drawings, the control flow of the control processing unit, and the like are merely one embodiment, and can be arbitrarily modified without departing from the gist of the present technology. That is, any other configurations, algorithms, and the like for carrying out the present technology may be employed.

At least two of the features according to the present technology described above may be combined. In other words, various features described in the respective embodiments may be arbitrarily combined across the embodiments. Further, the various effects described above are merely illustrative, not limitative, and other effects may be provided.

It should be noted that the present technology can also take the following configurations.

(1) An information processing apparatus, including:
an instruction determining unit that determines an instruction related to communication using a code image with an external apparatus; and
a signal output unit that outputs, on the basis of the determined instruction related to the communication, a signal for controlling an operation related to communication of the external apparatus.

(2) The information processing apparatus according to (1), in which
the signal is a signal that is capable of being received by the external apparatus at a predetermined distance from the information processing apparatus.

(3) The information processing apparatus according to (1) or (2), in which
the signal includes at least one of an audio signal or an optical signal.

(4) The information processing apparatus according to any one of (1) to (3), further including
a display unit, in which
the instruction related to the communication includes an instruction to cause the display unit to display the code image.

(5) The information processing apparatus according to any one of (1) to (4), in which
the external apparatus is capable of performing each of the communication using the code image and a near field communication (NFC) communication, and
the signal causes the external apparatus to perform an operation related to the communication using the code image and regulates an operation related to the NFC communication.

(6) The information processing apparatus according to (5), in which
the signal regulates output of a polling signal as the regulation of the operation related to the NFC communication.

(7) The information processing apparatus according to (6), in which
the signal is a signal that is capable of being received by the external apparatus at a distance longer than an arrival distance of the polling signal output from the external apparatus.

(8) The information processing apparatus according to any one of (5) to (7), further including
a communication unit capable of performing the NFC communication with the external apparatus, in which
the instruction determining unit determines an instruction related to the NFC communication, and
the signal output unit is capable of causing the external apparatus to perform the operation related to the NFC communication on the basis of the determined instruction related to the NFC communication and outputting a signal for regulating the operation related to the communication using the code image.

(9) An information processing method, including:
by a controller in an information processing apparatus,
determining an instruction related to communication using a code image between an external apparatus and the information processing apparatus; and
outputting a signal for controlling an operation related to the communication between the external apparatus and the information processing apparatus on the basis of the determined instruction related to the communication.

(10) An information processing apparatus, including:
a code reading unit that performs communication using a code image with an external apparatus;
an NFC communication unit that performs communication using near field communication (NFC) with an external apparatus;
a detecting unit that detects peripheral information; and
a communication operation control unit that controls an operation related to the communication of the code reading unit and the NFC communication unit on the basis of the detected peripheral information.

(11) The information processing apparatus according to (10), in which
the peripheral information includes at least one of sound information regarding a sound, optical information regarding light, image information regarding an image, and motion information regarding an object.

(12) The information processing apparatus according to (10) or (11), in which
the communication operation control unit generates a signal for controlling the operation related to the communication of the code reading unit and the NFC communication unit on the basis of the detected peripheral information and controls the operation related to the communication of the code reading unit and the NFC communication unit on the basis of the generated signal.

(13) The information processing apparatus according to (12), in which
the signal includes any one of an audio signal, an optical signal, a motion signal, or an image signal.

(14) The information processing apparatus according to any one of (10) to (13), in which
the communication operation control unit is capable of causing reading of the code image by the code reading unit to be performed and regulating an operation related to the NFC communication by the NFC communication unit.

(15) The information processing apparatus according to any one of (10) to (14), in which
the communication operation control unit is capable of regulating reading of the code image by the code reading unit and causing an operation related to the NFC communication by the NFC communication unit to be performed.

(16) The information processing apparatus according to (14) or (15), in which
the operation related to the NFC communication includes output of a polling signal.

(17) The information processing apparatus according to (13), in which
the signal includes the audio signal, the optical signal, and the motion signal, and
the communication operation control unit sets a degree of priority to each of the audio signal, the optical signal, and the motion signal on the basis of the detected peripheral information and controls the operation related to the communication of the code reading unit and the NFC communication unit on the basis of the set degree of priority.

(18) An information processing method, including:
by a controller in an information processing apparatus,
detecting peripheral information; and
controls an operation related to communication using a code image with an external apparatus and communication using a near field communication (NFC) with the external apparatus on the basis of the detected peripheral information.

REFERENCE SIGNS LIST 10 communication terminal
11 speaker
14 touch panel
16 NFC communication unit
19 illumination unit
21 communication unit
25 control signal output unit
30 reader/writer
31 speaker
32 microphone
33 camera
35 communication unit
36 NFC communication unit
43 code reading unit
44 peripheral information detecting unit
45 communication operation control unit
100 communication system

The invention claimed is:

1. An information processing apparatus, comprising:
an instruction determining unit configured to determine an instruction related to communication using a code image with an external apparatus; and
a signal output unit configured to output, on a basis of the determined instruction related to the communication, a signal for controlling an operation related to communication of the external apparatus,
wherein the signal output unit outputs the signal for controlling the operation related to the communication of the external apparatus on a basis of detected peripheral information, and
wherein the instruction determining unit and the signal output unit are each implemented via at least one processor.

2. The information processing apparatus according to claim 1, wherein
the signal is a signal that is capable of being received by the external apparatus at a predetermined distance from the information processing apparatus.

3. The information processing apparatus according to claim 1, wherein
the signal includes at least one of an audio signal or an optical signal.

4. The information processing apparatus according to claim 1, further comprising
a display unit, wherein
the instruction related to the communication includes an instruction to cause the display unit to display the code image.

5. The information processing apparatus according to claim 1, wherein
the external apparatus is capable of performing each of the communication using the code image and a near field communication (NFC) communication, and the signal causes the external apparatus to perform an operation related to the communication using the code image and regulates an operation related to the NFC communication.

6. The information processing apparatus according to claim 5, wherein
the signal regulates output of a polling signal as the regulation of the operation related to the NFC communication.

7. The information processing apparatus according to claim 6, wherein
the signal is a signal that is capable of being received by the external apparatus at a distance longer than an arrival distance of the polling signal output from the external apparatus.

8. The information processing apparatus according to claim 5, further comprising
a communication unit capable of performing the NFC communication with the external apparatus, wherein
the instruction determining unit determines an instruction related to the NFC communication, and
the signal output unit is capable of causing the external apparatus to perform the operation related to the NFC communication on a basis of the determined instruction related to the NFC communication and outputting a signal for regulating the operation related to the communication using the code image.

9. An information processing method, executed by a controller of an information processing apparatus, the method comprising:
determining an instruction related to communication using a code image between an external apparatus and the information processing apparatus; and
outputting a signal for controlling an operation related to the communication between the external apparatus and the information processing apparatus on a basis of the determined instruction related to the communication,
wherein the signal for controlling the operation related to the communication between the external apparatus and the information processing apparatus is output on a basis of detected peripheral information.

10. An information processing apparatus, comprising:
a code reading unit configured to perform communication using a code image with an external apparatus;
an NFC communication unit configured to perform communication using near field communication (NFC) with an external apparatus;
a detecting unit configured to detect peripheral information; and
a communication operation control unit that control configured to control an operation related to the communication of the code reading unit and the NFC communication unit on a basis of the detected peripheral information,
wherein the communication operation control unit is further configured to generate a signal for controlling the operation related to the communication of the code reading unit and the NFC communication unit on a basis of the detected peripheral information, and
wherein the code reading unit, the NFC communication unit, the detecting unit, and the communication operation control unit are each implemented via at least one processor.

11. The information processing apparatus according to claim 10, wherein
the peripheral information includes at least one of sound information regarding a sound, optical information regarding light, image information regarding an image, and motion information regarding an object.

12. The information processing apparatus according to claim 10, wherein
the communication operation control unit controls the operation related to the communication of the code reading unit and the NFC communication unit on a basis of the generated signal.

13. The information processing apparatus according to claim 12, wherein
the signal includes any one of an audio signal, an optical signal, a motion signal, or an image signal.

14. The information processing apparatus according to claim 13, wherein
the signal includes the audio signal, the optical signal, and the motion signal, and
the communication operation control unit sets a degree of priority to each of the audio signal, the optical signal, and the motion signal on a basis of the detected peripheral information and controls the operation related to the communication of the code reading unit and the NFC communication unit on a basis of the set degree of priority.

15. The information processing apparatus according to claim 10, wherein
the communication operation control unit is capable of causing reading of the code image by the code reading unit to be performed and regulating an operation related to the NFC communication by the NFC communication unit.

16. The information processing apparatus according to claim 15, wherein
the operation related to the NFC communication includes output of a polling signal.

17. The information processing apparatus according to claim 10, wherein
the communication operation control unit is capable of regulating reading of the code image by the code reading unit and causing an operation related to the NFC communication by the NFC communication unit to be performed.

18. An information processing method, executed by a controller of an information processing apparatus, the method comprising:
detecting peripheral information; and
controlling an operation related to communication using a code image with an external apparatus and communication using a near field communication (NFC) with the external apparatus on a basis of the detected peripheral information,
wherein a signal for controlling the operation related to the communication of the external apparatus is generated on a basis of the detected peripheral information.

* * * * *